United States Patent
Chu et al.

(10) Patent No.: US 9,913,208 B1
(45) Date of Patent: Mar. 6, 2018

(54) SYSTEM AND METHOD FOR PROVIDING SCHEDULE INFORMATION USED TO SNOOP RANGING EXCHANGES BETWEEN WIRELESS DEVICES

(71) Applicant: MARVELL INTERNATIONAL LTD., Hamilton (BM)

(72) Inventors: Liwen Chu, San Ramon, CA (US); Sagar Tamhane, Santa Clara, CA (US); Sarang Shrikrishna Wagholikar, Sunnyvale, CA (US); Hongyuan Zhang, Fremont, CA (US); Hui-Ling Lou, Sunnyvale, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 150 days.

(21) Appl. No.: 14/642,891

(22) Filed: Mar. 10, 2015

Related U.S. Application Data

(60) Provisional application No. 61/950,710, filed on Mar. 10, 2014.

(51) Int. Cl.
*H04W 48/16* (2009.01)
*H04W 24/08* (2009.01)
*H04W 64/00* (2009.01)

(52) U.S. Cl.
CPC ........... *H04W 48/16* (2013.01); *H04W 24/08* (2013.01); *H04W 64/00* (2013.01)

(58) Field of Classification Search
None
See application file for complete search history.

(56) References Cited

U.S. PATENT DOCUMENTS

| 2014/0295877 | A1* | 10/2014 | Hart ........................ H04W 4/02 455/456.1 |
| 2015/0094103 | A1* | 4/2015 | Wang .................... H04W 4/023 455/456.6 |
| 2015/0139212 | A1* | 5/2015 | Wang ........................ G01S 5/06 370/338 |
| 2015/0179130 | A1* | 6/2015 | Smadi .................... G09G 5/006 345/520 |
| 2015/0215057 | A1* | 7/2015 | Knowles ............... H04W 64/00 455/3.05 |
| 2015/0257028 | A1* | 9/2015 | Chu ........................ G01S 13/74 370/252 |

* cited by examiner

*Primary Examiner* — Charles C Jiang
*Assistant Examiner* — George Atkins, Jr.

(57) ABSTRACT

Apparatus, methods, and other embodiments associated with obtaining schedule information to support snoop ranging are described. According to one embodiment, a method is performed by a station device on a computer network and includes establishing a network association with a network device of the computer network. The method also includes receiving schedule information from the network device without having to previously transmit to the network device to initiate acquisition of the schedule information. The schedule information is negotiated between other network devices communicating in the computer network, or between the network device and at least one of the other network devices. The schedule information is communicated to the network device and specifies timing associated with a ranging exchange between the other network devices, or between the network device and at least one of the other network devices, and may be used by the station device for snooping.

15 Claims, 6 Drawing Sheets

SYSTEM AND METHOD FOR PROVIDING SCHEDULE INFORMATION USED TO SNOOP RANGING EXCHANGES BETWEEN WIRELESS DEVICES

CROSS REFERENCE TO RELATED APPLICATIONS

This patent disclosure claims the benefit of U.S. Provisional Application Ser. No. 61/950,710 filed on Mar. 10, 2014, which is hereby wholly incorporated by reference.

BACKGROUND

A client device (e.g., a mobile wireless device) may be configured to passively listen to (snoop) transmit/receive exchanges (constituting a ranging exchange) between two access points on a computer network. The purpose of a ranging exchange is to measure or record times associated with transmitting and receiving messages between the two access points. The times can be used to determine a range (a distance) between the client device and the two access points. The client device may use the information obtained (e.g., timing information) from the ranging exchange between the two access points, along with other information the client device similarly obtains by listening to other ranging exchanges between other pairs of access points, to determine a location of the client device. Determining the location of a client device in this manner may be desirable, for example, when the client device is indoors without access to global positioning system (GPS) signals.

SUMMARY

In general, in one aspect this specification discloses an apparatus that includes association logic configured to establish a network association between the apparatus and a first network device in a computer network. The apparatus also includes frame reception logic configured to receive, via at least one of the network association or a management frame, schedule information from the first network device without the apparatus having to previously transmit to the first network device to initiate reception of the schedule information by the apparatus. The schedule information specifies a timing associated with a ranging exchange between the first network device and a second network device in the computer network that is not associated with the apparatus. Furthermore, the schedule information is negotiated by the second network device with the first network device. The apparatus further includes snoop logic configured to, based on the timing specified by the schedule information, initiate listening to the ranging exchange between the first network device and the second network device to receive at least timing measurements generated during the ranging exchange.

In general, in another aspect, this specification discloses a method that is performable, for example, by a station device on a computer network. The method includes establishing a network association with a network device of the computer network. The method also includes receiving, via at least one of the network association or a management frame, schedule information from the network device without having to previously transmit to the network device to initiate reception of the schedule information. The schedule information is negotiated between other network devices communicating in the computer network, or between the network device and at least one of the other network devices, and is communicated to the network device. The schedule information specifies a timing associated with a ranging exchange between the other network devices, or between the network device and at least one of the other network devices. The method further includes, based on the timing specified by the schedule information, initiating listening to the ranging exchange, between the other network devices or between the network device and at least one of the other network devices, to receive at least timing measurements generated during the ranging exchange.

In general, in another aspect, this specification discloses an integrated circuit device of a mobile wireless station. In one embodiment, the integrated circuit device includes association logic configured to establish a network association between the mobile wireless station and a network device of a computer network. The integrated circuit device also includes frame reception logic configured to receive, via at least one of the network association or a management frame, schedule information from the network device without the mobile wireless station having to previously transmit to the network device to initiate reception of the schedule information by the mobile wireless station. The schedule information is negotiated between other network devices communicating in the computer network that are not associated with the mobile wireless station. The schedule information is communicated to the network device and specifies a timing associated with a ranging exchange between the other network devices. The integrated circuit device further includes snoop logic configured to, based on the timing specified by the schedule information, initiate listening to the ranging exchange between the other network devices to obtain at least timing measurements generated during the ranging exchange.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Figure 1:
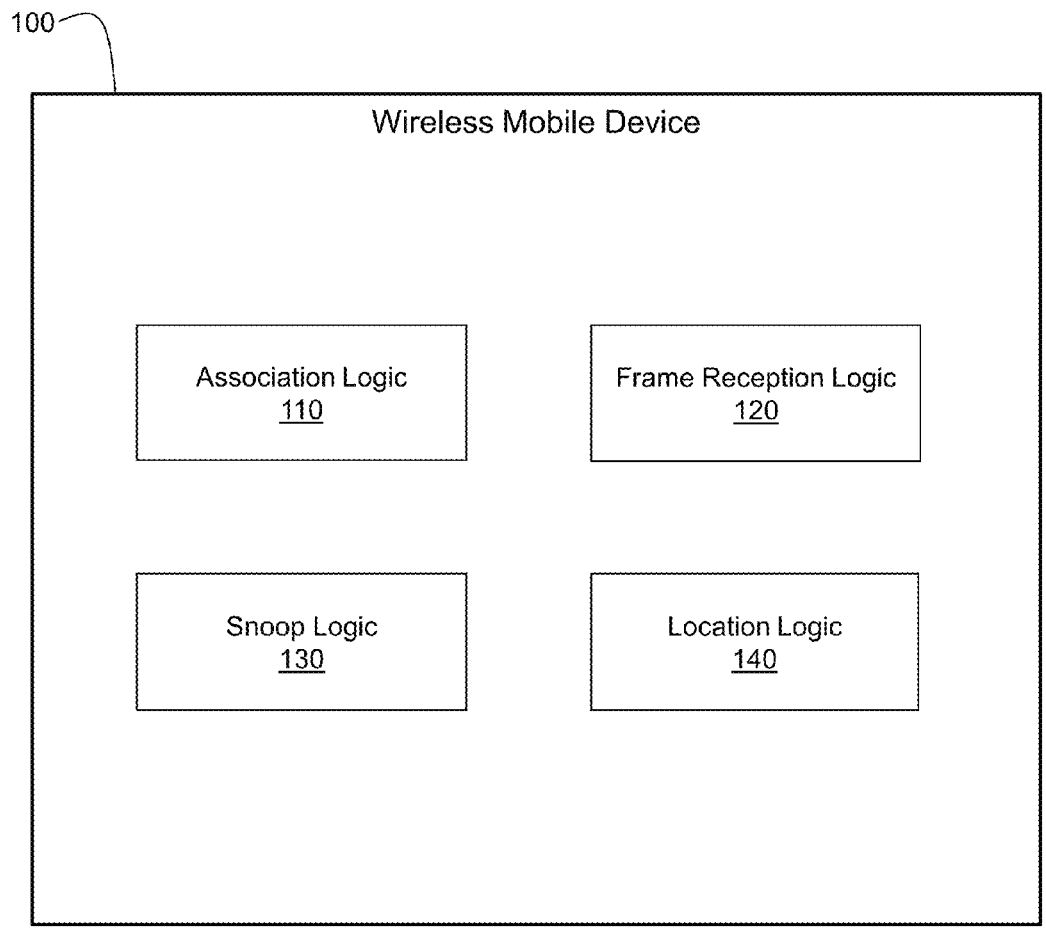
FIG. 1 illustrates a first example embodiment of an apparatus configured to acquire schedule information to support ranging exchange snooping operations on a computer network.

Described herein are examples of systems, apparatus, methods, and other embodiments associated with providing a capability to efficiently acquire schedule information for ranging exchanges between network devices on a computer network for the purpose of snooping the ranging exchanges. In one embodiment, a client device (e.g., a wireless mobile device) establishes a network association with a network device on a computer network. The client device and the associated network device operate on the same channel to, for example, exchange large volumes of data at high speed.

The client device may obtain schedule information of upcoming (i.e., future) ranging exchanges between other network devices on the computer network from the associated network device. One or more of the other network devices communicate the schedule information to the associated network device and the schedule information is communicated to the wireless mobile device (e.g., via a beacon transmission from the associated network device). In this manner, the wireless mobile device does not have to communicate with any of the other network devices to obtain schedule information, which could be inefficient (e.g., may have to change channels) and use more battery power of the wireless mobile device (e.g., may have to transmit requests to the other network devices).

As an alternative embodiment, the client device could get schedule information from one of the other network devices through a beacon message which is transmitted by one of the other network devices on a periodic basis. However, this alternative way creates more overhead since the wireless mobile device would have to listen for the beacon of one of the other network devices at the appropriate time (possibly on another channel), possibly degrading communication efficiency with the associated network device.

By more efficiently obtaining schedule information, a wireless mobile device may passively (receive only) listen in on ranging exchanges between the other network devices, or between another network device and the associated network device, by performing snooping operations. The wireless mobile device may use information obtained by such snooping operations to determine a current spatial location of the wireless mobile device.

The term "association" or "network association", as used herein, refers to a cooperative relationship that is formed, which is supported by the exchange of protocol control information, for the purpose of exchanging data (e.g., exchanging large volumes of data at high speed) between two devices on a computer network. For example, a wireless mobile device may form a network association with an access point in a computer network to gain access to the internet. When an association request frame is sent from a wireless mobile device to an access point, it enables the access point to allocate resources and synchronize. The frame may carry information about a wireless network interface controller, including supported data rates and the service set identifier (SSID) of the computer network the wireless mobile device wishes to associate with. If the request is accepted, the access point can reserve memory and establish an association identification (ID) for the wireless network interface controller.

The term "ranging exchange", as used herein, refers to a combination of wireless transmit and receive message exchanges between two devices on a computer network for the purpose of measuring or recording the times that messages are transmitted from the devices and received at the devices. For example, in one embodiment of a ranging exchange, fine-timing-measurement (FTM) messages (frames) and acknowledge (ACK) messages (frames) may be transmitted and received between network devices, and corresponding times and/or round-trip-time measurements may be recorded. Such recorded times and/or measurements may be used for determining a range (distance) between the network devices and/or a location of a network device.

The term "schedule information", as used herein, refers to information that specifies the details of when and how a ranging exchange will take place between two network devices in the future. For example, schedule information may include a snoop operation indication, a first burst start time, a burst period, and a burst duration of an upcoming ranging exchange between two network devices in a computer network. The schedule information may also include channel information indicating a communication channel on which the ranging exchange will occur. Furthermore, the schedule information may include a media access control (MAC) address of a network device taking part in an upcoming ranging exchange. The schedule information may be negotiated between two network devices in a computer network.

The term "snooping" and variations thereof, as used herein, refer to a third party device listening to a ranging exchange between two network devices in a computer network by passively receiving the transmissions from the two network devices during the ranging exchange.

The term "wireless access point" or "access point (AP)" or "access point device", as used herein with respect to computer networking, refers to a device that allows wireless devices to connect to a wired network using Wi-Fi, or related standards.

The term "beacon frame" or "beacon message" or "beacon, as used herein refers to one of the management frames in a computer network that is based on a wireless communication standard (e.g., IEEE 802.11). A beacon frame contains information about the computer network and is transmitted periodically (e.g., by access points) to announce the presence of the wireless network. Beacon frames may include schedule information, as described herein.

The term "management frame" or "broadcast management message" or "management message", as used herein, refers to data frames transmitted and received by network devices in a computer network that allow for the maintenance of communication. Some common IEEE 802.11 management frames include a beacon frame, an authentication frame, an association request frame, an association response frame, a deauthentication frame, a disassociation frame, a probe request frame, a probe response frame, a reassociation request frame, and a reassociation response frame.

FIG. 1 illustrates a first example embodiment of an apparatus 100 configured to acquire schedule information to support ranging exchange snooping operations on a computer network. The apparatus includes association logic 110, frame reception logic 120, snoop logic 130, and location logic 140. In one embodiment, the apparatus 100 is a wireless mobile device capable of connecting to a wireless computer network (e.g., via a WiFi access point).

Figure 5:
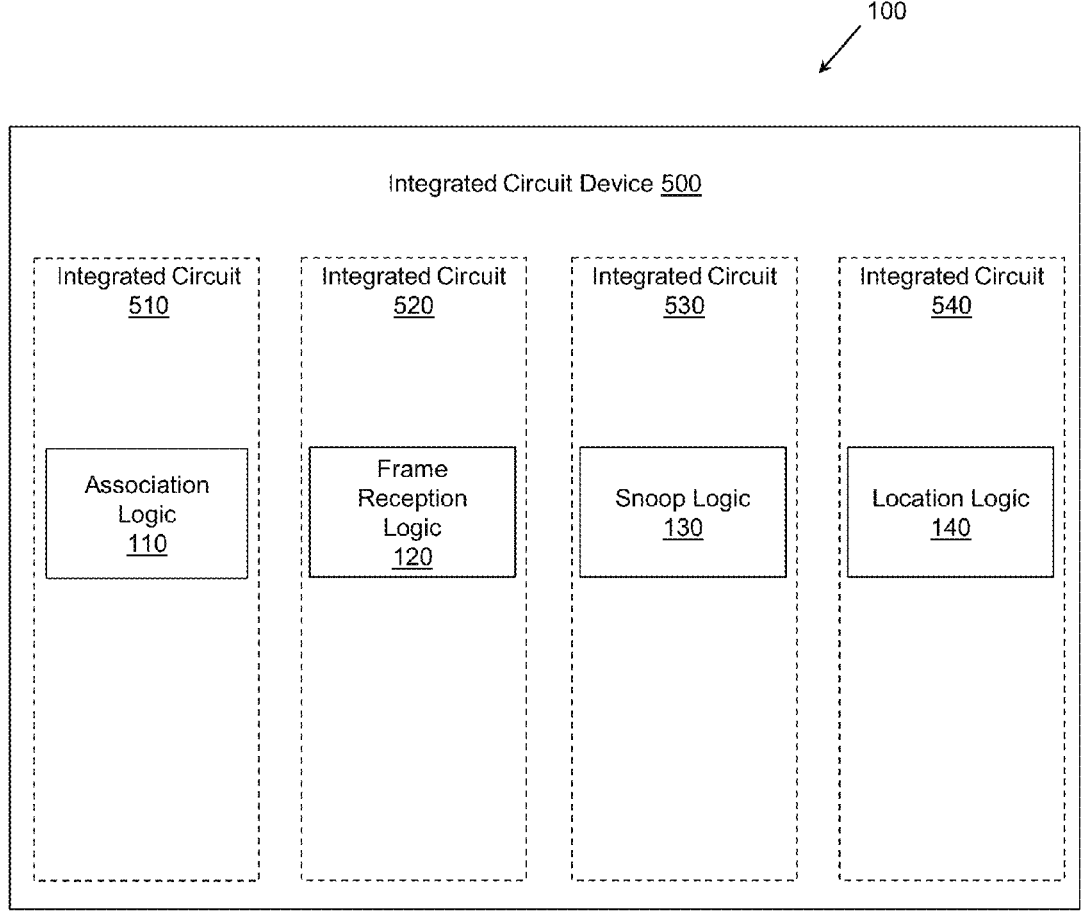
FIG. 5 illustrates one example embodiment of the apparatus of FIG. 1 implemented as an integrated circuit device.

In one embodiment, the apparatus 100 is implemented on a chip (i.e., a system-on-chip or SOC configuration) including one or more integrated circuits configured to perform one or more of the functions described herein (see FIG. 5). In another embodiment, the logics of the apparatus 100 may be part of an executable algorithm configured to perform the functions of the logics where the algorithm is stored in a non-transitory medium.

Referring to FIG. 1, the association logic 110 is configured to establish a network association between the apparatus 100 and a network device (e.g., an access point or AP) in a computer network. For example, in one embodiment, the apparatus 100 may be a wireless mobile device and the association logic may establish an association with a wireless access point (AP1) in a computer network. It may be desirable for the wireless mobile device to maintain association with AP1 but still be able to gain access to schedule information about ranging exchanges between other AP's on the computer network via associated AP1.

The frame reception logic 120 is configured to receive schedule information from an associated network device (e.g., a wireless AP, AP1). The schedule information may be received via the network association or via, for example, a beacon frame. The schedule information may specify a timing associated with a ranging exchange (e.g., a future ranging exchange) between a pair of network devices in the computer network, where at least one of the network devices is not associated with the apparatus 100. The schedule information is negotiated between the pair of network devices.

In accordance with one embodiment, the frame reception logic 120 of the apparatus 100 is configured to receive schedule information from an associated network device (e.g., AP1) via a management frame (e.g., a beacon frame) transmitted by the associated network device. The frame reception logic 120 may be configured to also, or alternatively, receive schedule information from a network device in the computer network that is not associated with the apparatus 100 via a management frame (e.g., a beacon frame) transmitted by the unassociated network device.

In one embodiment negotiation of the schedule information may be initiated and controlled by a network device of the pair of network devices that is not associated with the apparatus (e.g., AP2). Such an unassociated network device AP2 may be responsible for and/or dedicated to negotiating schedule information and performing ranging exchanges with network devices in the computer network. For example, AP2 may constantly switch channels to negotiate schedule information and conduct ranging exchanges with other network devices on the respective channels of the other network devices.

As another example, in one embodiment, the schedule information may be negotiated by a first unassociated network device AP2 with a second unassociated network device AP3 (i.e., AP2 and AP3 are not associated with the apparatus 100). The resulting schedule information may be communicated from AP2 to the associated network device AP1.

For example, AP2, being responsible for and/or dedicated to negotiating schedule information and performing ranging exchanges with network devices in the computer network, may provide schedule information to AP1 which specifies an upcoming ranging exchange between AP2 and AP3. The schedule information may be provided to AP1 from AP2 when AP2 comes back to the channel on which AP1 is operating and communicates with AP1 (e.g., via a beacon frame or other public action frame).

In accordance with one embodiment, AP2 may instead be a non-AP device that is configured to broadcast schedule information to the apparatus 100 and perform a ranging exchange with AP1 during a notice of absence period of the non-access point device. For example, in one embodiment, the non-AP device may be a printer device configured as a group owner (GO). The non-AP device may exist in a fixed position for a long period of time and may be configured to initiate a ranging exchange similar to AP2.

In this manner, the apparatus 100 may efficiently obtain schedule information for various ranging exchanges to take place on a computer network. In a first embodiment, the apparatus 100 may only communicate with an associated network device (e.g., AP1) and does not have to change channels or use more battery power of the apparatus 100 to communicate with other unassociated network devices (e.g., does not have to transmit requests to the other network devices). In a second embodiment, the apparatus may passively receive, for example, a beacon message (having schedule information) from an unassociated network device (e.g., AP2) at a designated time while maintaining association with AP1. However, this second embodiment may create more overhead than the first embodiment. For example, the apparatus 100 may have to listen for the beacon from AP2 at the appropriate time (possibly on another channel). This could possibly degrade communication efficiency with the associated network device AP1, but maybe not.

Referring again to FIG. 1, the snoop logic 130 is configured to use schedule information (e.g., the timing specified in the schedule information) to initiate listening to (snooping of) a ranging exchange between two network devices to receive timing measurements (e.g., time-stamp information and/or round-trip-time measurements) generated as part of the ranging exchange. In accordance with one embodiment, location information of each of the two network devices may also be received by listening in on the ranging exchange. Alternatively, location information of each of the two network devices may be received by the apparatus 100 when a management frame (e.g., a beacon frame) is transmitted from each of the two network devices, respectively, or from an associated AP (e.g., AP1). Ranging exchanges and snoop operations are further discussed later herein with respect to FIG. 3 and FIG. 4.

The location logic 140 is configured to receive at least the timing measurements from the snoop logic 130. The location logic 140 is further configured to generate location information, characterizing a current location of the apparatus 100, based at least in part on the timing measurements. For example, other additional information may be used to generate the location information. The other additional information may include the locations of the two network devices. The other additional information may also include the locations of other pairs of network devices in the computer network as well as timing measurements from corresponding ranging exchanges that have been snooped by the apparatus 100 for those other pairs of network devices.

Figure 2:
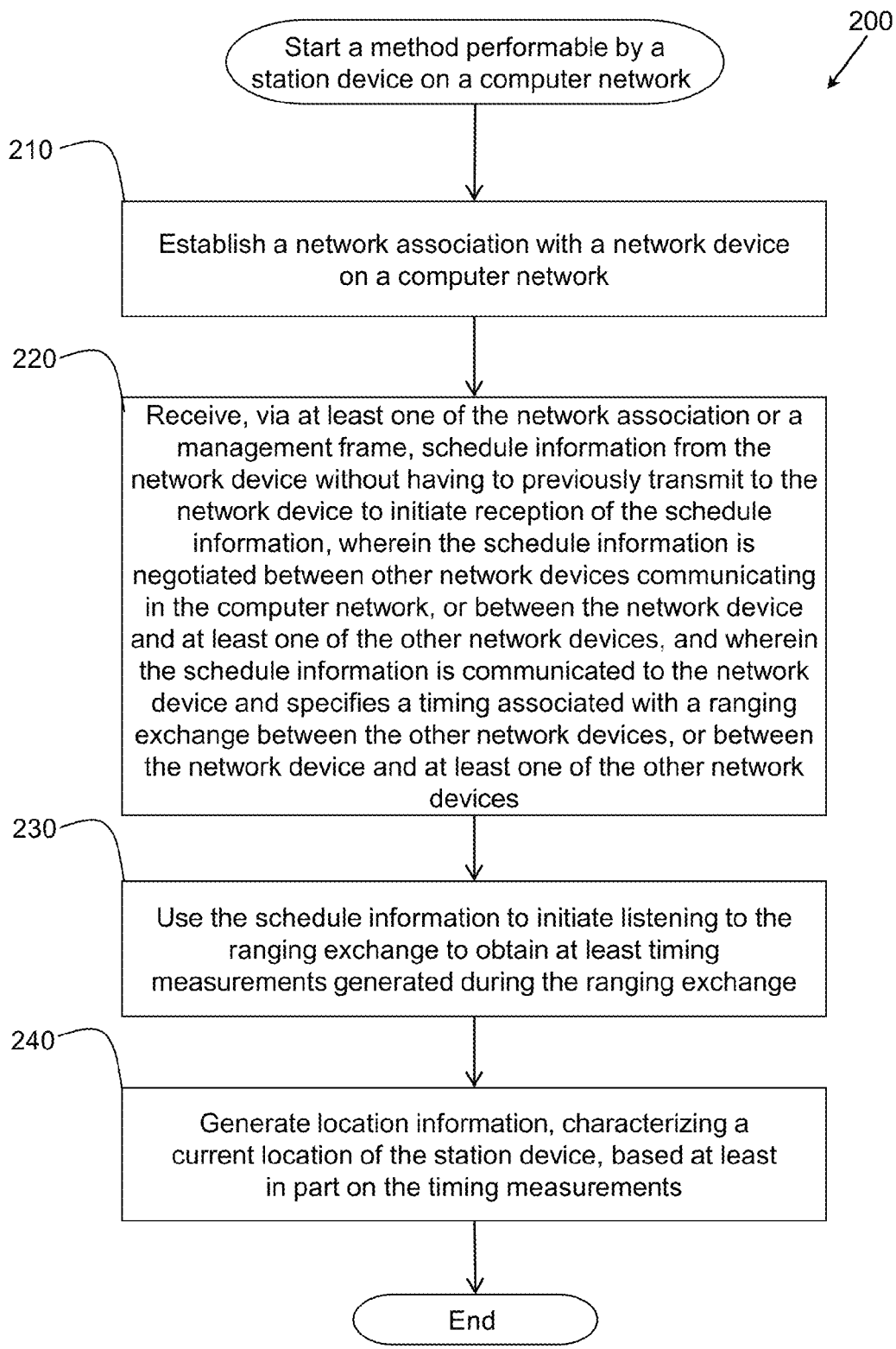
FIG. 2 illustrates an example embodiment of a method, performed by the apparatus of FIG. 1, for acquiring schedule information to support ranging exchange snooping operations on a computer network.

FIG. 2 illustrates an example embodiment of a method 200, performed by the apparatus of FIG. 1, for acquiring schedule information to support ranging exchange snooping operations on a computer network. Method 200 is implemented to be performed by the apparatus 100 of FIG. 1, or by a computing device (e.g., an integrated circuit device) configured with an algorithm of method 200. Method 200 will be described from the perspective that the apparatus (or the computing device) is a station device (e.g., a wireless mobile device) operable to connect to a wireless computer network.

Method 200 starts when the apparatus 100 attempts to connect to a wireless computer network. The wireless computer network may include access point devices and non-access point devices, for example. In one embodiment, one of the access point devices is responsible for and/or dedicated to negotiating schedule information and performing ranging exchanges with other network devices in the computer network. The other access point devices may be configured to allow wireless devices to connect to a wired network using Wi-Fi, or related standards.

Upon initiating method 200 at 210, the apparatus 100 establishes a network association with a network device (e.g., an access point) on the computer network. For example, the apparatus 100 may be a wireless mobile device being used by a user in an airport. The user may desire to wirelessly connect the apparatus 100 to a wireless computer network provided by the airport to gain access to the internet. The wireless computer network provided by the airport may include many network devices (e.g., many access points) throughout the airport. The apparatus 100 may be configured to seek out an access point that is better than the other access points for establishing the association. For example, one access point may be closest to the apparatus, or is not currently being used by as many users. In one embodiment, the association logic 110 of the apparatus 100 is configured to establish the association.

Once the network association is established between the apparatus 100 and a network device, then at 220, the apparatus receives schedule information from the associated network device via, for example, the network association or a management frame. The schedule information may be for an upcoming ranging exchange negotiated between the associated network device and another network device that is not associated with the apparatus 100. Alternatively, the schedule information may be for an upcoming ranging exchange negotiated between a pair of network devices, neither of which is associated with the apparatus 100.

In one embodiment, the schedule information is transmitted by the associated network device in a management frame (e.g., a beacon frame) which is received by the apparatus 100. The frame reception logic 120 is configured to receive the schedule information from the associated network device, in accordance with one embodiment. The associated network device may obtain the schedule information from another network device, for example, via a beacon message from the other network device or via a ranging exchange negotiation with another network device.

In this manner, the apparatus 100 does not have to communicate with any other network device to acquire the schedule information for an upcoming ranging exchange between two network devices. The apparatus 100 simply receives the schedule information from the associated network device (e.g., without having to previously transmit to the associated network device to initiate acquisition of the schedule information). Having to communicate with other network devices to obtain schedule information could tax the battery of the apparatus 100 and increase overhead operations (e.g., if the apparatus 100 had to transmit requests for the schedule information or periodically listen to beacon messages of other network devices on other channels).

At 230, the schedule information is used by the apparatus 100 to initiate a snooping operation. That is, based on the timing specified by the schedule information, the apparatus 100 initiates listening to the corresponding ranging exchange between a pair of network devices. The schedule information tells the apparatus when and how to listen to the ranging exchange. For example, the schedule information may include a first burst start time, a burst period, and a burst duration of the ranging exchange. Furthermore, the schedule information may indicate the channel on which the ranging exchange will take place. In accordance with one embodiment, the snoop logic 130 of the apparatus 100 is configured to perform the snooping operation.

By listening to the ranging exchange, the apparatus 100 may acquire, for example, time stamp information and/or round-trip-time measurements generated during the ranging exchange. Other information, such as the locations of the pair of network devices performing the ranging exchange, may also be acquired during the snooping operation, in accordance with one embodiment. In another embodiment, information related to the locations of the pair of network devices performing the ranging exchange may be part of the schedule information, or may be obtained by the apparatus 100 from the associated network device which obtained the location information by other means (e.g., by listening to beacon messages transmitted by other network devices where the beacon messages include location information).

The apparatus 100 may perform several snooping operations to listen in on other pairs of network devices to acquire timing measurements, and/or location information of the pairs of network devices. Then, at 240, the apparatus 100 may generate location information based on the acquired information to characterize a current location of the apparatus 100 (e.g., within the airport). In one embodiment, the location information is generated by the location logic 140 of the apparatus 100. In one embodiment, the location logic employs triangulation techniques to determine the location of the apparatus 100. In another embodiment, hyperbolic navigation solutions are employed to determine the location of the apparatus 100. Other location-determining techniques may be employed in other embodiments.

Figure 3:
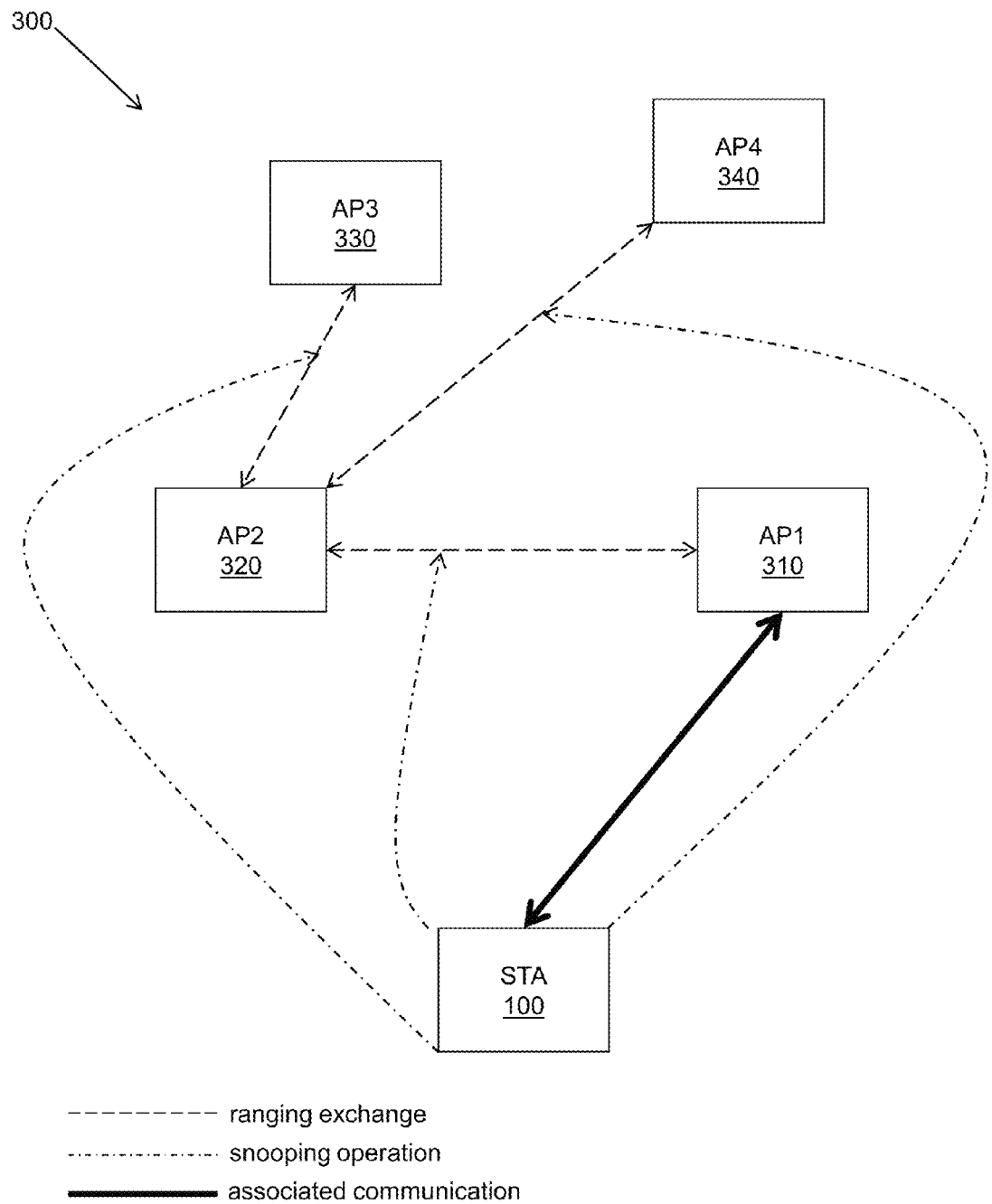
FIG. 3 illustrates an example embodiment of communications between devices on a computer network using the method of FIG. 2.

FIG. 3 illustrates an example embodiment of communications between devices on a computer network 300 using the method 200 of FIG. 2. The computer network 300 includes the apparatus or station device (STA) 100 of FIG. 1, a first wireless access point device 310 (AP1), a second wireless access point device 320 (AP2), a third wireless access point device 330 (AP3), and a fourth wireless access point device 340 (AP4). The computer network 300 may be located at, for example, an airport or a shopping mall, in accordance with some embodiments. STA 100 is a mobile wireless device and AP1-AP4 are at fixed locations within the airport or shopping mall.

STA 100 is associated with AP1 310 as indicated by the solid double-arrowed line between STA 100 and AP1 310 in FIG. 3. For example, STA 100 may use AP1 310 to access the internet. AP2 320 is responsible for and dedicated to negotiating schedule information and performing ranging exchanges with AP1, AP3, and AP4 in the computer network 300. For example, AP2 320 may constantly switch channels to negotiate schedule information and conduct ranging exchanges with AP1, AP3, and AP4 on their respective channels of operation. Ranging exchanges are indicated by the dashed double-arrowed lines in FIG. 3.

STA 100 may conduct snooping operations to listen in on the ranging exchanges taking place between AP2 320 and each of the other access point devices. The snooping operations are indicated by the dashed and dotted single-arrowed lines in FIG. 3. In one embodiment, for any ranging exchange that is snooped by STA 100, the schedule information for that ranging exchange comes to STA 100 from AP1 310 which is associated with STA 100. For example, AP1 310 may transmit the schedule information in a beacon frame that is received by STA 100. AP1 310 may originally receive the schedule information from AP2 320, for example, in a beacon frame that is transmitted by AP2 320. AP2 320 may acquire schedule information for all of the ranging exchanges between the various access point device on the network 300, as part of negotiating the ranging exchanges, and broadcast that schedule information periodically in a beacon frame which may be received by AP1 310.

In this manner, STA 100 can acquire the schedule information for the various upcoming ranging exchanges between the various network devices without having to communicate with AP2 320, AP3 330, or AP4 340. STA 100 may stay on the same channel as AP1 310 (except maybe when snooping), maintain its association with AP1 310, and continue to conduct, for example, high volume and high speed data communications with AP1 310 (e.g., internet access through AP1 310).

STA 100 may simply use brief periods of time to perform snooping operations in accordance with the schedule information. The ranging exchange between AP2 320 and AP1 310 may occur on the same channel as STA 100. However, the ranging exchange between AP2 320 and AP3 330, or between AP2 320 and AP4 340, may occur on a different channel. STA 100 may switch to a different channel for a brief period of time to perform a snooping operation.

In accordance with another embodiment, instead of receiving schedule information from AP1 310, STA 100 may receive schedule information from AP2 320 via, for example, a beacon frame transmitted by AP2 320. AP2, because of its role as a dedicated ranging exchange negotiator, may have the schedule information for all of the pairs of access point devices in the network 300. The schedule information for all of the pairs of access point devices in the network 300 could be contained in a single beacon frame, for example. STA 100 would have to know when and on what channel a beacon frame is going to be transmitted by AP2 320. As a result, obtaining the schedule information from AP2 may not be as efficient as obtaining the schedule information from AP1.

Similarly, STA 100 may receive schedule information from AP3 330 or AP4 340 via, for example, beacon frames transmitted by AP3 330 and AP4 340. Again, station 100 would have to know when and on what channels the beacon frames are going to be transmitted. As a result, obtaining the schedule information from AP3 and AP4 may not be as efficient as obtaining the schedule information from AP2 or from AP1.

In this manner, there are several scenarios in which schedule information can get to STA 100 without STA 100 having to perform additional actions. For example, STA 100 may obtain schedule information without having to transmit (e.g., without STA 100 having to transmit a request message of any kind). Also, STA 100 may obtain schedule information without having to engage directly in a ranging exchange after receiving the schedule information (e.g., without having to engage in a ranging exchange with AP1 310). Furthermore, STA 100 may obtain schedule information without having to form a two-way communication path of any kind with any other network device, except for the associated network device (e.g., AP1 310). As discussed herein, some of the scenarios for acquiring schedule information may be more efficient than others, for example, depending on particular circumstances in the computer network.

Figure 4:
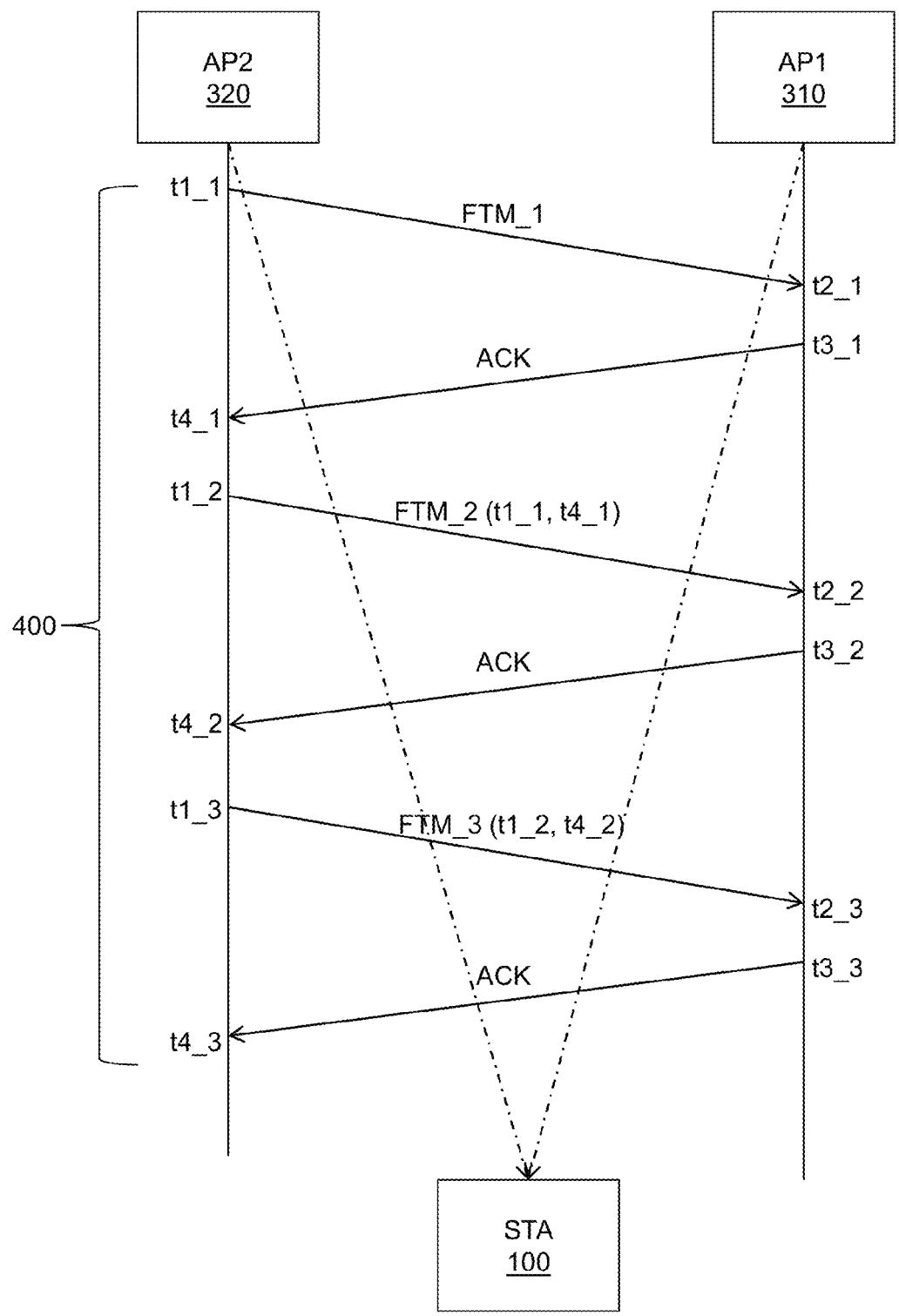
FIG. 4 illustrates an example embodiment of a ranging exchange between two network devices being snooped by the apparatus of FIG. 1 in a computer network using the method of FIG. 2.

FIG. 4 illustrates an example embodiment of a ranging exchange 400 between two network devices AP1 310 and AP2 320 on the network 300 of FIG. 3. In FIG. 4, the ranging exchange is being snooped by the apparatus 100 of FIG. 1 (STA 100) in the network 300 of FIG. 3 using the method 200 of FIG. 2. As shown in the embodiment of FIG. 4, the ranging exchange 400 includes three sets of fine-timing-measurement (FTM)/acknowledgement (ACK) exchanges. During a ranging exchange, timing measurements (e.g., time stamp information and/or round-trip-time measurements) may be determined.

During the ranging exchange 400, a first FTM frame (FTM_1) is transmitted from AP2 320 to AP1 310. FTM_1 leaves AP2 at time t1_1 and arrives at AP1 at time t2_1. A first acknowledge message (ACK_1) is then transmitted from AP1 to AP2. ACK_1 leaves AP1 at time t3_1 and arrives at AP2 at time t4_1. Similarly, a second FTM frame (FTM_2) is transmitted from AP2 to AP1. FTM_2 leaves AP2 at time t1_2 and arrives at AP1 at time t2_2. In one embodiment, FTM_2 contains the times t1_1 and t4_1 as time stamp information. A second acknowledge message (ACK_2) is then transmitted from AP1 to AP2. ACK_2 leaves AP1 at time t3_2 and arrives at AP2 at time t4_2.

Finally, a third FTM frame (FTM_3) is transmitted from AP2 to AP1. FTM_3 leaves AP2 at time t1_3 and arrives at AP1 at time t2_3. In one embodiment, FTM_3 contains the times t1_2 and t4_2 as time stamp information. A third acknowledge message (ACK_3) is then transmitted from AP1 to AP2. ACK_3 leaves AP1 at time t3_3 and arrives at AP2 at time t4_3. The various times (t1_1, t2_1, etc.) may be recorded by AP1 and/or AP2 as time stamp information. Alternatively, only some of the times may be recorded. For example, in one embodiment, the only times that are recorded are t1_1, t4_1, t1_2, t4_2, t1_3, and t4_3 by AP2.

STA 100 may perform a snoop operation as indicated by the dotted and dashed lines in FIG. 4. In accordance with one embodiment, FTM_2 may be snooped by STA 100 to acquire time stamp information t1_1 and t4_1. Similarly, FTM_3 may be snooped by STA 100 to acquire time stamp information t1_2 and t4_2. Again, the time stamp information may be used, for example, by the location logic 140 of STA 100 (along with other information) to determine a current location of the STA 100.

For example, the location logic 140 may take the time stamp information and generate round-trip-time (RTT) measurements (e.g., [t4_1−t1_1], [t4_2−t1_2], [t4_3−t1_3]) which are used in the determination of location. The location logic 140 may also use the time when FTM_i arrives at the STA 100 (where i is one of 1, 2, 3, etc.) and the time when ACK of FTM_i arrives at the STA 100. The more FTM/ACK exchanges that occur and are snooped within a ranging exchange, the more accurate may be a subsequent determination of a current location of STA 100.

In an alternative embodiment, instead of transmitted FTM frames containing time stamp information, FTM frames may contain the round-trip-time (RTT) measurements (e.g., [t4_1−t1_1], [t4_2−t1_2], [t4_3−t1_3]) which are derived from the time stamp information by AP1. In other embodiments, an FTM frame may contain other information such as, for example, the location of an access point device (e.g., AP2).

In this manner, STA 100 can listen (passively receive) information from ranging exchanges which can be used to determine a current location of the STA 100. As a user moves around with the STA 100 (e.g., within an airport or a mall having the computer network 300), the STA 100 can update its current location by performing subsequent snooping operations after obtaining schedule information for ranging exchanges as discussed herein.

In one embodiment, a station (STA) may negotiate a ranging exchange with AP1 310 and AP1 may broadcast the schedule information corresponding to that negotiated ranging exchange in a beacon frame. The station (STA) may be STA 100 that is associated with AP1, or may be another station (STA) on the computer network (e.g., a newly introduced station). In another embodiment, an access point working in its operation channel may broadcast a management frame (e.g., an FTM frame with itself as the receiver, or another management frame) after a beacon transmission. This may increase the chance that a snooping station in a power saving mode will receive the schedule information.

Referring to FIG. 3, in one embodiment, when an access point (e.g., AP2 in FIG. 3) switches to the channel of another access point (e.g., AP4 in FIG. 3) to perform a ranging exchange, the access point (AP2) may transmit a broadcast management message to announce the corresponding schedule information. For example, AP2 may include schedule information for other channels negotiated with other access points, and may broadcast a beacon message in its working channel which includes the schedule information for the other channels.

In accordance with one embodiment, a non-AP device (e.g., a printer configured as a group owner) that is in a fixed position for a relatively long time may also initiate a ranging exchange (similar to AP2 320 in FIG. 3). The group owner can announce a notice of absence (NOA) schedule and perform a ranging exchange during the scheduled NOA period. In accordance with another embodiment, a non-AP device that is in a fixed position for a relatively long period of time may also function similarly to AP1 310 in FIG. 3.

Integrated Circuit Device Embodiment

FIG. 5 illustrates one example embodiment of the apparatus 100 of FIG. 1 implemented as an integrated circuit device 600. In this embodiment, the association logic 110, the frame reception logic 120, the snoop logic 130, and the location logic 140 are each embodied as a separate integrated circuit 510, 520, 530, and 540, respectively.

The circuits are connected via connection paths to communicate signals. While integrated circuits 510, 520, 530, and 540 are illustrated as separate integrated circuits, they may be integrated into a common integrated circuit device 500. Additionally, integrated circuits 510, 520, 530, and 540 may be combined into fewer integrated circuits or divided into more integrated circuits than illustrated.

In another embodiment, the association logic 110, the frame reception logic 120, the snoop logic 130, and the location logic 140 (which are illustrated in integrated circuits 510, 520, 530, and 540, respectively) may be combined into a separate application-specific integrated circuit. In other embodiments, portions of the functionality associated with the association logic 110, the frame reception logic 120, the snoop logic 130, and the location logic 140 may be embodied as firmware executable by a processor and stored in a non-transitory memory (e.g., a non-transitory computer storage medium).

IEEE 802.11 Embodiment

Figure 6:
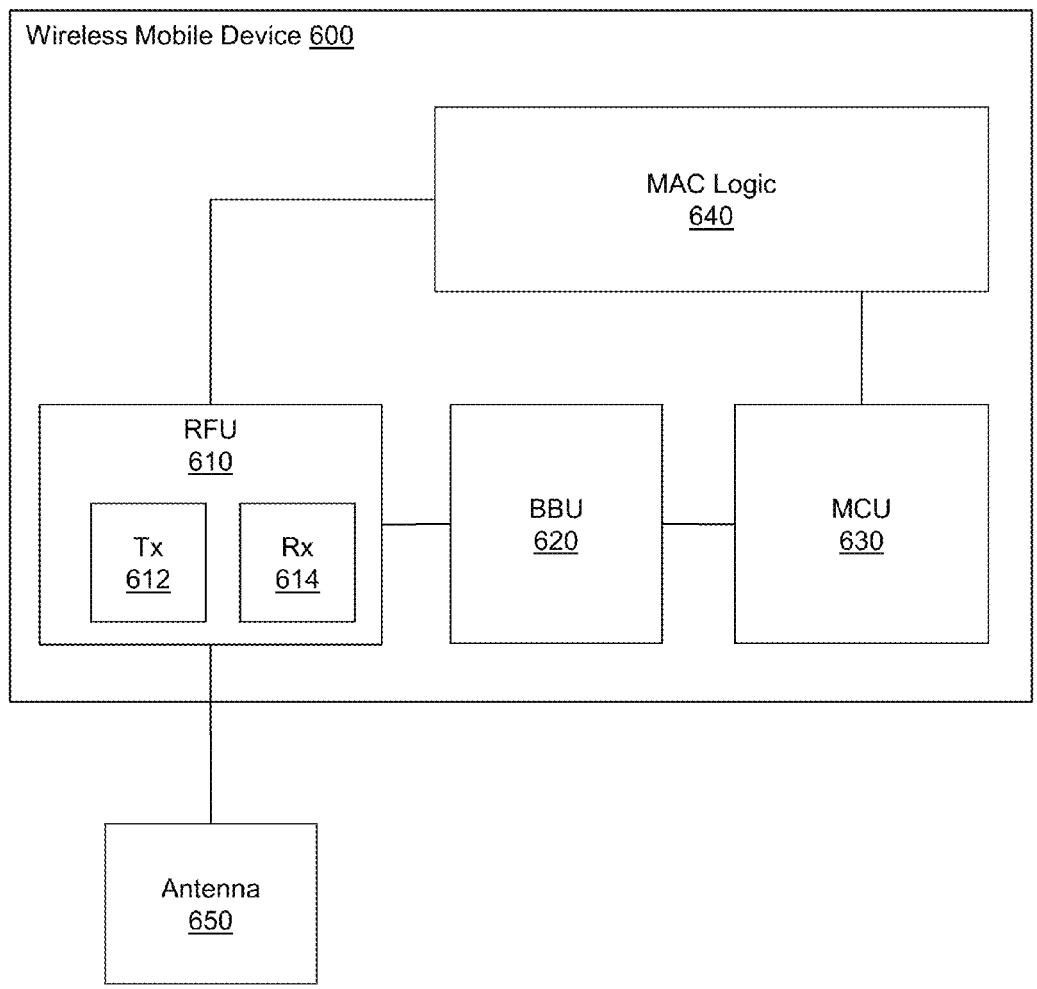
FIG. 6 illustrates a second example embodiment of an apparatus configured to acquire schedule information to support ranging exchange snooping operations on a computer network.

FIG. 6 illustrates a second example embodiment of an apparatus 600 configured to acquire schedule information (e.g., using the method 200 of FIG. 2) to support ranging exchange snooping operations on an IEEE 802.11 compatible computer network. In one embodiment, the apparatus 600 is a wireless mobile device. The apparatus 600 includes a radio frequency unit (RFU) 610, a baseband unit (BBU) 620 and a media access control (MAC) hardware unit (MCU) 630. The radio frequency unit 610 is operably connected to an antenna(s) 650. The radio frequency unit 610 includes both a receive (Rx) circuit 614 and a transmit (Tx) circuit 612.

In one embodiment, the transmit circuit 612 is configured to transmit radio frequency signals to the antenna 650, and the receive circuit 614 is configured to receive radio frequency signals from the antenna 650. The baseband unit 620 is configured to analyze radio frequency signals received by the radio frequency unit 610, and to provide received information to the MCU 630. The MCU 630 is configured to work in cooperation with the baseband unit 620 to provide information to MAC logic 640. MAC logic 640 is configured to perform the functionality of various modes of operation and control the radio frequency unit in accordance with a current mode of operation (e.g. a snooping operation).

In the embodiment of FIG. 6, the functions of the logics of FIG. 1 (association logic 110, frame reception logic 120, snoop logic 130, and location logic 140) are distributed among the elements of the apparatus 600. For example, in one embodiment, the functionality of location logic 140 may be implemented in MAC logic 640. The functionality of snoop logic 130 may be collectively supported by all of the elements of the apparatus 600, and the antenna 650.

The MAC hardware unit 630 and the radio frequency unit 610 are configured to communicate with MAC logic 640. MAC logic 640 is configured to receive schedule information from the MAC hardware unit 630 and provide a control message to the radio frequency unit 610. The control message puts the radio frequency unit 610 in a snoop operation mode where the radio frequency unit 610 operates passively (no transmit) in a receive only snoop operation mode.

The control message can control the Rx block 614 and the Tx block 612 collectively and/or individually, in accordance with various embodiments. While control for snoop operation is described, MAC logic 640 can control the radio frequency unit 610 to operate in other modes that use various combinations of transmit and receive protocols (e.g., a network association mode that performs functions of the association logic 110 to establish an association with a wireless access point device).

In different embodiments, MAC logic 640 can be, but is not limited to, hardware, firmware, instructions in execution on a machine, and/or combinations thereof to perform a function(s) or an action(s), and/or to cause a function or action from another logic, method, apparatus, and/or system. MAC logic 640 may include a software controlled microprocessor, a discrete logic (e.g., ASIC), an analog circuit, a digital circuit, a programmed logic device, a memory device containing instructions, and so on. MAC logic 640 may include one or more gates, combinations of gates, or other circuit components. Other "logics" described herein may take forms similar to those described in connection with MAC logic 640.

Systems, methods, and other embodiments associated with providing acquisition of schedule information to support ranging exchange snooping operations on a computer network have been described. According to one embodiment, a wireless mobile device includes association logic, frame reception logic, snoop logic, and location logic. The association logic is configured to establish a network association between the wireless mobile device and a first network device in a computer network. The frame reception logic is configured to receive schedule information from the first network device without the mobile wireless device having to transmit to initiate acquisition of the schedule information. The schedule information specifies a future ranging exchange between the first network device and a second network device in the computer network that is not associated with the apparatus. Furthermore, the schedule information is negotiated by the second network device with the first network device. The snoop logic is configured to use the schedule information to initiate listening to the ranging exchange to receive at least timing measurements generated during the ranging exchange. The location logic is configured to receive at least the timing measurements from the snoop logic and generate location information based at least in part on the timing measurements. The location information characterizes a current location of the wireless mobile device.

Definitions and Other Embodiments

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"Operable interaction", as used herein, refers to the logical or communicative cooperation between two or more logics via an operable connection to accomplish a function.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

What is claimed is:

1. An apparatus comprising:
   association logic configured to establish a network association between the apparatus and a first network device in a computer network, wherein the apparatus is a mobile wireless device and the first network device is a wireless access point at a fixed location in the computer network;
   frame reception logic implemented in at least a first circuit configured to receive schedule information comprising, for a ranging exchange, (i) a first burst start time, (ii) a burst period, and (iii) a burst duration, wherein the ranging exchange is to occur between (i) the first network device and (ii) a second network device in the computer network that is not associated with the apparatus, wherein the schedule information is received from the first network device via beacon frames transmitted by the first network device, wherein the beacon frames are transmitted without the apparatus having to transmit a request for the schedule information to the first network device, wherein the first burst start time, the burst period, and the burst duration included in the schedule information specify a timing associated with the ranging exchange, and wherein the first burst start time, the burst period, and the burst duration included of the schedule information are negotiated by the second network device with the first network device; and
   snoop logic implemented in at least a second circuit configured to, based on the timing specified by the first burst start time, the burst period, and the burst duration included in the schedule information, initiate snooping operations for listening to wireless communications in the computer network to listen to the ranging exchange between the first network device and the second network device;
   wherein snoop logic is configured to perform the snooping operations without having to engage in the ranging exchange;
   wherein the snooping operations are configured to acquire at least timing measurements generated during the ranging exchange and location information related to the first network device and the second network device; and
   location logic implemented in at least a third circuit configured to (i) receive at least the timing measurements and location information from the snoop logic, and (ii) generate location information that characterizes a current location of the apparatus using triangulation, based at least in part on the timing measurements.

2. The apparatus of claim 1, wherein the second network device is a wireless access point in the computer network.

3. The apparatus of claim 1, wherein the ranging exchange is a fine-timing-measurement (FTM) exchange providing the timing measurements.

4. The apparatus of claim 1, wherein the frame reception logic is configured to receive the schedule information from the second network device via a beacon frame transmitted by the second network device.

5. The apparatus of claim 1, wherein the schedule information is negotiated by the second network device with a third network device in the computer network that is not associated with the apparatus, instead of being negotiated by the second network device with the first network device, and wherein the schedule information is communicated from the second network device to the first network device, and wherein the schedule information specifies a timing associated with a ranging exchange between the second network device and the third network device.

6. The apparatus of claim 1, wherein the second network device is a non-access point device configured to broadcast the schedule information to the apparatus.

7. A method performable by a station device on a computer network, the method comprising:
   establishing a network association with a network device of the computer network;
   receiving, by the station device, schedule information comprising (i) a first burst start time, (ii) a burst period, and (iii) a burst duration of the ranging exchange, wherein the schedule information is received from the network device via beacon frames transmitted by the network device, wherein the beacon frames are transmitted without having to transmit a request for the schedule information to the network device, wherein the schedule information is negotiated between other network devices communicating in the computer network, or between the network device and at least one of the other network devices, and wherein the schedule information is communicated to the network device and specifies a timing associated with a ranging exchange between the other network devices, or between the network device and at least one of the other network devices; and
   based on the timing specified by the schedule information, initiating snooping operations for listening to wireless communications in the computer network to listen to the ranging exchange between the other network devices or between the network device and at least one of the other network devices
   wherein the snooping operations are performed without the station device having to engage in the ranging exchange;
   wherein the snooping operations acquire at least timing measurements generated during the ranging exchange and location information related to the network device and at least one of the other network devices; and
   generating location information that characterizes a current location of the station device using triangulation, based at least in part on the timing measurements and the location information.

8. The method of claim 7, further comprising receiving the schedule information from at least one of the other network devices instead of the network device without making a request to the at least one of the other network devices.

9. The method of claim 7, wherein the station device is a mobile wireless device, and wherein each of the network device and the other network devices is respectively a wireless access point in the computer network.

10. The method of claim 7, wherein the ranging exchange is a fine timing measurement (FTM) exchange providing the timing measurements.

11. An integrated circuit device, comprising:
association logic implemented in at least hardware and configured to establish a network association between a mobile wireless station and a network device of a computer network;
frame reception logic implemented in at least hardware and configured to receive schedule information comprising (i) a first burst start time, (ii) a burst period, and (iii) a burst duration of the ranging exchange, wherein the schedule information is received from the network device via beacon frames transmitted by the network device, wherein the beacon frames are transmitted without the mobile wireless station having to transmit a request for the schedule information, wherein the schedule information is negotiated between other network devices communicating in the computer network that are not associated with the mobile wireless station, and wherein the schedule information is communicated to the network device and specifies a timing associated with a ranging exchange between the other network devices; and
snoop logic implemented in at least hardware and configured to, based on the timing specified by the schedule information, initiate snooping operations for listening to wireless communications in the computer network to listen to the ranging exchange between the other network devices;
wherein snoop logic is configured to perform the snooping operations without having to engage in the ranging exchange;
wherein the snooping operations are configured to acquire at least timing measurements generated during the ranging exchange and location information related to the other network devices communicating in the computer network; and
location logic connected to the snoop logic and configured to (i) receive at least the timing measurements and location information from the snoop logic, and (ii) generate location information that characterizes a current location of the mobile wireless station using triangulation, based at least in part on the timing measurements and the location information.

12. The integrated circuit device of claim 11, wherein the frame reception logic is configured to receive the schedule information from the network device via a management frame transmitted from the network device.

13. The integrated circuit device of claim 11, wherein the frame reception logic is configured to receive the schedule information from at least one of the other network devices without making a request to the at least one of the other network devices.

14. The integrated circuit device of claim 11, wherein each of the network device and the other network devices is respectively a wireless access point in the computer network.

15. The integrated circuit device of claim 11, wherein the schedule information is negotiated by one of the other network devices with the network device, instead of being negotiated between the other network devices, and wherein the schedule information specifies a timing associated with a ranging exchange between (i) the one of the other network devices, and (ii) the network device.

* * * * *